United States Patent Office 3,759,817
Patented Sept. 18, 1973

3,759,817
BLEND COMPRISING HYDROREFINED OIL AND
UNHYDROREFINED OIL
Ivor W. Mills, Media, and Glenn R. Dimeler, West
 Chester, Pa., assignors to Sun Oil Company of Pennsylvania, Philadelphia, Pa.
Continuation-in-part of applications Ser. No. 622,398,
 Mar. 11, 1967, now Patent No. 3,462,358, Ser. No.
 652,026, July 10, 1967, now Patent No. 3,502,567, Ser.
 No. 730,999, May 22, 1968, Ser. No. 850,716, Aug. 18,
 1969, now abandoned, Ser. No. 850,717, Aug. 18, 1969,
 now abandoned, Ser. No. 873,008, Oct. 31, 1969, and
 Ser. No. 22,295, Mar. 24, 1970, now Patent No.
 3,681,233. This application July 22, 1971, Ser. No.
 165,141
Int. Cl. H01b 3/22
U.S. Cl. 208—14                    12 Claims

ABSTRACT OF THE DISCLOSURE

A hydrocarbon oil, useful as an electrical insulation medium, having an impulse breakdown strength of at least 150 kv., an ASTM D-1313 test value no greater than 0.1 and which will pass at least 50 hours of the ASTM D-943 stability test, can be prepared by a process comprising blending 50-98 parts (preferably 70-95) of a severely hydrorefined naphthenic oil having a VGC from 0.820-0.899, a viscosity from 40 to 200 SUS at 100° C. and an ultraviolet absorptivity (UVA) of less than 0.04 in the 335 millimicron region with from 50-2 parts (preferably 30-5, for good D-1313 typically 10%) by weight of unhydrogenated naphthenic distillate (which preferably is free from naphthenic acids). The unhydrogenated distillate can be a raffinate from extraction with an aromatic selective solvent (e.g. furfural, phenol). Another blended oil, having a sludge-free Doble life of up to 75 hours, can be prepared by the process of blending the unhydrogenated distillate, the hydrogenated distillate, and a cycle oil. In such blends the cycle oil can be from 0.1-10 weight percent of the blend, the concentration preferably being such that the ratio of the ultraviolet absorptivity at 335 millimicrons to the absorptivity at 330 millimicrons in the blended product is no less than 1.0. Preferably, the blended oils contain less than 25 p.p.m. of total nitrogen and less than 5 p.p.m. (typically less than 1 p.p.m.) of basic nitrogen. Blends of unhydrorefined distillate, with a paraffinic lube oil (which can be hydrorefined) are useful as textile oils or as technical white oils. Such blends can also contain a hydrorefined naphthenic oil.

CROSS-REFERENCE TO RELATED APPLICATIONS

This application is a continuation-in-part of all of our applications listed in the following table.

| Serial number | Filing date | Patent number | Issue date | Title |
|---|---|---|---|---|
| 622,398 | 3-13-67 | 3,462,358 | 8-19-69 | Clay Treatment of Hydrorefined Cable Oils. |
| 652,026 | 7-10-67 | 3,502,567 | 3-24-70 | Process for Producing Cable Oils by Sequential Refining Steps. |
| 730,999 | 5-22-68 | | | Hydrorefined Transformer Oil and Process of Manufacture. |
| 850,716 | 8-18-69 | Now abandoned | | Blended Hydrocarbon Oil and Process of Manufacture. |
| 850,717 | 8-18-69 | Now abandoned | | Hydrorefined Lube Oil and Process of Manufacture. |
| 873,008 | 10-31-69 | | | Oil and Process of Manufacture of Blended Hydrorefined Oil. |
| 22,295 | 3-24-70 | Now U.S. Patent 3,681,233 | | Hydrorefined Cable Oil and Process of Manufacture. |

In addition to the previously noted patent applications, the following earlier filed copending applications, all assigned to the Sun Oil Company (as is the present application), are related to the disclosure of the present application. The disclosure of all of the following applications and of the above-cited patent applications is hereby incorporated in the present application:

| Serial number | Filing date | Patent number | Issue date | Title—Inventors |
|---|---|---|---|---|
| 636,493 | 5-5-67 | 3,681,279 | 8-1-72 | Process for Preparing an Aromatic Oil and Non-discoloring Rubber Composition Containing Said Oil—Ivor W. Mills, Glenn R. Dimeler and Merritt C. Kirk, Jr. |
| 792,131 | 1-17-69 | 3,699,071 | 10-17-72 | High Modulus Composition Comprising Hydrocarbon Oil, Rubber and Carbon Black—Ivor W. Mills, Glenn R. Dimeler, Merritt C. Kirk, Jr., and Jackson S. Boyer. |
| 812,516 | 2-19-69 | 3,619,414 | 11-9-71 | Catalytic Hydrofinishing of Petroleum Distillates in the Lubricating Oil Boiling Range—Ivor W. Mills, Merritt C. Kirk, Jr., and Albert T. Olenzak. |
| 850,778 | 8-18-69 | 3,654,127 | 4-4-72 | Process for Preparing High Viscosity Hydrorefined Cable Oil—Ivor W. Mills, Glenn R. Dimeler, William F. Atkinson, and James P. Hoffman. |
| 850,779 | 8-18-69 | 3,586,752 | 6-22-71 | Electrical Conduit Containing Hydrorefined Oil—Ivor W. Mills, Glenn R. Dimeler and John J. Melchiore. |
| 874,087 | 10-27-69 | 3,706,653 | 12-19-72 | Light-colored Highly Aromatic Oil and Process of Preparation—Ivor W. Mills, Glenn R. Dimeler and Merritt C. Kirk, Jr. |
| 35,231 | 5-6-70 | | | Hydraulic Oil Composition Containing a Blended Base Stock—John Q. Griffith III, Edward S. Williams, William H. Reiland, Jr., Ivor W. Mills and Glenn R. Dimeler. |
| 60,642 | 8-3-70 | Now abandoned | | Textile Machinery Lubricant Composition—James R. Amaroso and John Q. Griffith III. |
| 70,590 | 9-8-70 | | | Catalytic Hydrofinishing of Lube Oil Product of Solvent Extraction of Petroleum Distillate—Ivor W. Mills, Merritt C. Kirk, Jr., and Albert T. Olenzak. |

The disclosure of all of the above-referred to applications is hereby incorporated herein by reference, particularly as to disclosure therein directed to hydrorefined oils in the lube viscosity range, to uses of such oils, and to the production of such oils.

BACKGROUND OF THE INVENTION

The properties of commercial oils used as insulating media in transformers are well known in the art and a list of typical characteristics is given in the text by F. M. Clark entitled Insulating Material for Design and Engineering Practice (1962), page 135. Such oils typically boil in the range of 460–775° F. and have viscosities in the range of 50 to 65 SUS (preferably 55 to 60 SUS) at 100° F., as may be seen by reference to Wasson et al., Pat. No. 3,000,807 and to Wynkoop and Bartlett, Pat. No. 3,406,111. There have also been reports of transformer oils having viscosities as low as 40 and as high as 200 SUS at 100° F. The viscosity gravity constant (i.e. VGC) of the transformer oil can be in the range of 0.82 to 0.92, preferably at least 0.84. The oils of the Wynkoop and Bartlett patent are characterized by extremely low total nitrogen content and a very long sludge-free life under the Doble test conditions.

The oils of the present invention can have a total nitrogen content as high as 25 p.p.m. but must have a basic nitrogen content less than 10 p.p.m. (preferably, less than 5 p.p.m., typically less than 1 p.p.m.). They generally have a sludge-free Doble life of less than 75 hours but have good stability under such test conditions as those of ASTM D–1313 and D–943 and have a good impulse breakdown strength. They generally have a VGC in the range of 0.820–0.899 and a viscosity at 100° F. in the range of 40–200 SUS.

A number of processes are known to the art for preparing conventional transformer oils from distillate fractions of naphthenic crude oils. In general, such processes effect the removal of a substantial proportion of the naturally-occurring naphthenic acids and the sulfur- and nitrogen-containing compounds which are present as impurities in the naphthenic distillate. A preferred means of removing the naphthenic acid impurities from the distillate is shown, for example, in U.S. Pats. 2,770,580; 2,795,532; 2,944,014; 2,966,456; and 3,080,312, and can involve conducting the distillation in the presence of a base, such as caustic.

A less preferred method is to remove the naphthenic acid impurity at a later stage in the refining process, such as by contacting with a basic clay in the final finishing or, in the case of hydrorefining, by converting the naphthenic acids to water and the corresponding naphthene (e.g., see The Manufacture of Electrical Insulating Oils by Jennings, H. C. and Lawley, J. R., paper presented to the Edison Electric Institute, Electrical System and Equipment Committees, Sept. 28, 1964, St. Louis, Mo.). The disadvantages of such processes involving removal of the naphthenic acids after the distillation stage are that the naphthenic acids can cause corrosion of equipment and reduce the effectiveness of the treatments for removing other polar compounds, such as the nitrogen- and sulfur-containing heterocyclic compounds. In addition, if the naphthenic acids are present in the hydrorefining stage, they are reduced to naphthenes which contain alkyl groups, such as a methyl group, which are susceptible to oxidation to aldehydes or to acids during normal usage in a transformer (e.g., in the presence of copper and oxygen).

One means of preventing such development of oxidation products from naphthenes containing oxidizable alkyl groups is to conduct at least part of the hydrorefining process under conditions (as those shown in the aforementioned Ser. No. 636,493 of Mills, Dimeler and Kirk) such that dealkylation (e.g., demethylation) will occur.

Conventional processes for decreasing the content of heterocyclic sulfur and nitrogen compounds in naphthenic distillate, to produce a transformer oil, involve interaction of such compounds with a reagent, such as hydrogen, which can cause them to decompose to $H_2S$ or $NH_3$ and the corresponding hydrocarbon, or involve interaction with a precipitant, such as an acid (e.g., $H_2SO_4$, HF, $BF_3$, etc.) or involve the use of an adsorbent such a attapulgite and/or an acid-activated clay, or an acidic, crystalline alumino-silicate zeolite adsorbent.

In such conventional processes for refining naphthenic distillate to produce a transformer oil, the process conditions are usually such that the removal of the sulfur- and nitrogen-containing impurities is not selective and the aromatic hydrocarbon content of the distillate is altered by the treatment. In the case of hydrorefining (particularly severe hydrorefining at pressures above about 800 p.s.i. of hydrogen and temperatures above about 500° C., in the presence of catalysts containing cobalt, nickel, molybdenum, tungsten, etc.), the total gel aromatics (such as the tetracyclic and pentacyclic condensed aromatic rings) are altered to a greater extent than are the less highly condensed aromatic compounds, such as those aromatic compounds which are polynuclear and contain only one aromatic ring.

The conversion by severe hydrorefining (under conditions favoring hydrogenation rather than dehydrogenation) of a polynuclear hydrocarbon having at least four condensed aromatic rings to a polynuclear hydrocarbon containing only one aromatic ring is illustrated by the following (reversible) chemical equations:

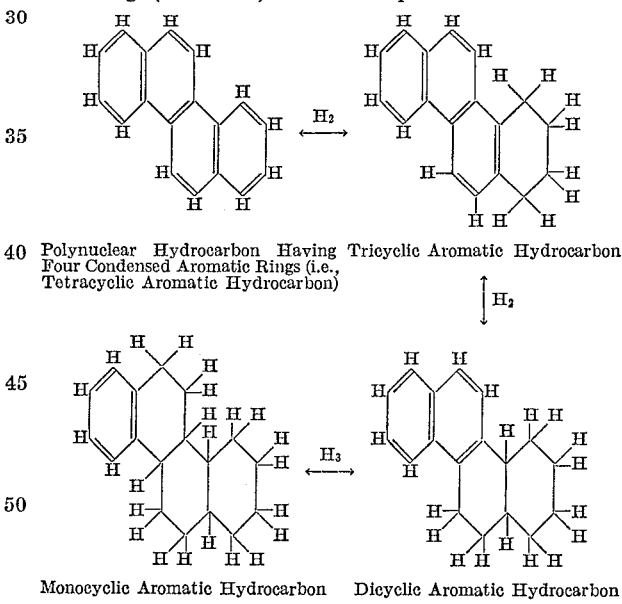

Polynuclear Hydrocarbon Having Four Condensed Aromatic Rings (i.e., Tetracyclic Aromatic Hydrocarbon)    Tricyclic Aromatic Hydrocarbon Monocyclic Aromatic Hydrocarbon    Dicyclic Aromatic Hydrocarbon In the present disclosure, a polynuclear hydrocarbon having four condensed aromatic rings will sometimes be referred to herein as a "tetracyclic aromatic hydrocarbon." Similarly, polynuclear hydrocarbons containing one, two or three aromatic rings will be referred to, respectively, as monocyclic, dicyclic and tricyclic aromatics. Note that this nomenclature does not indicate the number of non-aromatic rings in the compounds denoted. Although non-aromatic rings influence the boiling range and fluid properties of the oil, we have discovered that the primary indicator of the oxidation stability (and impulse breakdown strength) of a transformer oil is the aromatic portion of the hydrocarbon, in particular, those aromatic substituents or groupings which contribute to the 335, 330 and 325 UVA of the oil.

Similarly, in the conventional acid treatment of naphthenic distillate to prepare transformer oil the conditions are such that (in order to obtain the desired degree of removal of the polar heterocyclic aromatic compounds in the oil) the total aromatic content of the oil is reduced by as much as 40 to 70%. An illustration of the degree of removal of aromatic compounds from naphthenic oils by conventional acid treatment is found in copending U.S. patent application, Ser. No. 657,438 of Schneider and Stuart, filed May 29, 1967.

We have discovered that in transformer oils produced from a naphthenic distillate by severe hydrorefining, or by conventional acid refining (including acid refining of a raffinate from extraction with an aromatic selective solvent), the content of desired tetracyclic and higher polynuclear aromatic hydrocarbons is such that the oil has an ultraviolet absorptivity at 335 millimicrons of less than 0.04 and that the proportion of such desired polycyclic aromatic compounds which contribute to the 335 UVA compared with less desirable compounds which contribute to the ultraviolet absorptivity at 330 UVA is such that the ratio 335 UVA/330 UVA is less than 1.0. In such oils, the ratio 335 UVA/325 UVA is also less than 1.0 and commonly is less than 0.5. We further discovered (see Ser. No. 730,999) that the sludge-free Doble life of such severely hydrorefined oil can be increased by increasing the content therein of polynuclear aromatic hydrocarbons which contribute to the 335 UVA. One such means is to add a cycle oil, which is rich in such polynuclears, to the severely hydrorefined oil.

For purposes of the present invention, the term 335 UVA denotes 335 millimicrons±one millimicron (or the 334–336 mM. region). Similarly, 330 mM. denotes 330±mM. (or the 329–331 mM. region).

SUMMARY OF THE INVENTION

The present invention involves our discovery that the performance of such tests as ASTM D–943 and ASTM D–1313 can be greatly increased in a severely hydrorefined naphthenic distillate having a 335 UVA less than about 0.04 (or in the long Doble life oils of application Ser. No. 730,999) if such oils are admixed with raw (i.e. unhydrogenated) naphthenic distillate (preferably naphthenic distillate which is substantially free of naphthenic acids). The unhydrogenated distillate can be a raffinate from extraction with an aromatic-selective solvent (e.g. furfural, phenol, SO₂). Prior to blending, the unhydrogenated distillate can be subjected to non-sulfonating acid treatment (to remove basic nitrogen compounds) and/or can be contacted with an adsorbent (e.g. alumina, activated carbon, attapulgite, Super Filtrol or the mixtures of U.S. Pat. 3,369,993).

We have further discovered (see Ser. No. 730,999) that a particularly desirable, novel transformer oil with a Doble life of at least 100 hours and typically at least 200 hours (to as much as 300 hours) has a proportion of desirable tetracyclic and higher polynuclear aromatic hydrocarbons which contribute to the 335 UVA to those less desirable materials which contribute to the 330 UVA such that the ratio of the 335 UVA is greater than 1.0. Preferably, when the oil contains less than 25 p.p.m. of nitrogen and from 25 to 400 p.p.m. of sulfur, the 335 UVA can be in the range of 0.06 to 2.0, although oils having a Doble life of 200–300 hours can be prepared having a 335 UVA in the range of 0.3 to 1.0. In such novel oils, the ratio 335 UVA to 325 UVA is commonly about 1.0 (e.g., 0.8 to 1.2).

One means of preparing such a novel transformer oil having a sludge-free Doble life greater than 100 hours is to add a highly dealkylated, highly condensed aromatic hydrocarbon to a severely hydrorefined naphthenic distillate having a 335 UVA less than 0.04. An especially preferred source of such highly dealkylated, highly condensed aromatic hydrocarbons is the recycle (boiling mainly in the range of 600–1000° F. at 1 atmosphere) from the catalytic cracking of gas oil, particularly a gas oil which is cracked in the presence of a cracking catalyst containing a crystalline alumino-silicate zeolite cracking component (see, for example, U.S. Pat. 3,312,615). For preparing our novel transformer oil, distillate fractions of such catalytically aromatized and dealkylated oils (particularly said recycle stock), boiling mainly in the range of 650–800° F. (more preferably 650–750° F.) are especially desirable components since their composition is such that the ratio 335 UVA/330 UVA is greater than 1.0. The 650–750° F. distillate is also preferred since it will not decrease the flash point or impart a brown or orange visible color to the oil. In general, our novel oils will have a light green fluorescent color and bloom.

Another means of improving the sludge-free Doble life of a severely refined naphthenic distillate having a 335 UVA less than 0.04 is to contact the hydrorefined oil in the presence of a dehydrogenation catalyst (such as sulfided nickel and molybdenum oxides on alumina) under conditions such that the tetracyclic and higher naphthenes and the polynuclear aromatics containing one, two or three aromatic rings in the hydrorefined oil are converted to tetracyclic and higher aromatic compounds, such catalytic contact being conducted at a liquid hourly space velocity (LHSV) of the fresh feed and/or at a recycle LHSV, or combination thereof, such that the resulting aromatized oil has a 335 UVA in the range of 0.04 to 2.5 and, more preferably, in the range of 0.06 to 1.0 (most preferably in the range of 0.15 to 0.4). In such oils, the addition of unhydrogenated naphthenic distillate can improve the D–1313 or D–943 test performance.

To insure proper electrical properties, the oils produced by our process can be contacted with an adsorbent, such as attapulgite or an acid-activated clay (e.g. Super Filtrol), preferably, in the final finishing stage of their manufacture.

By naphthenic distillate, we refer to distillate fractions (or mildly acid treated or solvent raffinates thereof), usually from vacuum distillation, of crudes which are classified as naphthenic (including "relatively naphthenic") by the viscosity-gravity constant (VGC) classification method. Typically such crudes are Gulf Coastal and include, for example, Refugio, Mirando, and Black Bayou. The lower VGC oils can be obtained from midcontinental crudes. Such fractions will have a VGC in the range of 0.820 to 0.899 and, usually a viscosity in the range of 40–200 SUS at 100° F. (typically, 50–70). In some cases the crude (and distillate) can have a VGC as high as 0.94. Blends containing such distillates where one (or more) component has a viscosity in the range of 200–12,000 SUS at 100° F. can also be used where the viscosity contributions of all of the components are such that the final blend of hydrorefined and unhydrorefined oil is within the range of 40–200 SUS at 100° F. For products such as textile oils, rubber process oils, refrigerator oils, and most lubricants, the final blend can have a viscosty at 100° F. as high as 1000 SUS, and can contain such components as hydrogenated olefin and/or a hydrocracked lube oil (preferably stabilized by furfural extraction), especially of 90+ VI. Such components are described, for example, in U.S. 3,595,796 and 2,960,-458 and in applications Ser. Nos. 895,302; 78,191 and 90,073.

Examples of such blending are seen in the base oils used for the textile machine oils of Ser. No. 60,642. Base oils for textile oils can advantageously contain unhydrorefined naphthenic distillate and either a solvent refined paraffinic lube (which can be hydrorefined), having a VGC of 0.780–0.819 a hydrorefined naphthenic lube, or a mixture of hydrorefined naphthenic and paraffinic (which can be hydrorefined) lubes, the final base oil generally having an SUS viscosity at 100° F. in the range of 60–600 SUS. Rubber process oils can contain as much as 75% of the unhydrogenated distillate.

BRIEF DESCRIPTION OF THE DRAWINGS

In the attached drawings, In FIG. 1, curve 1 illustrates the UVA curve obtained from a severely hydrorefined naphthenic acid-free, naphthenic distillate which has been clay contacted in the final finishing stage. Curve 2 is that of a sulfuric acid-contacted, furfural raffinate of a naphthenic acid-free, naphthenic distillate which has been contacted with clay in the final finishing stage. Curve 3 is illustrative of a novel transformer oil prepared according to Example II herein. Curve 4 is that of a commercially available hydrorefined transformer oil (which may or may not be "prior art") which contains a broad distribution of types of aromatic hydrocarbons and which does not possess the type and distribution of tetracyclic and higher aromatic hydrocarbons as taught in our invention and, thus, has a ratio of 336 UVA/330 UVA less than 1.0. Note that when oil 3 and oil 4 are compared in the 260 to 330 millimicron region, the shape of the absorptivity curves is very similar, indicating that the materials present in each oil which contribute to absorptivity in this region, are quite similar in nature and proportions. In contrast, in the 330–335 millimicron region the difference in the absorptivity curves is startling and indicates a substantial difference in the composition of the two oils.

Figure 1:
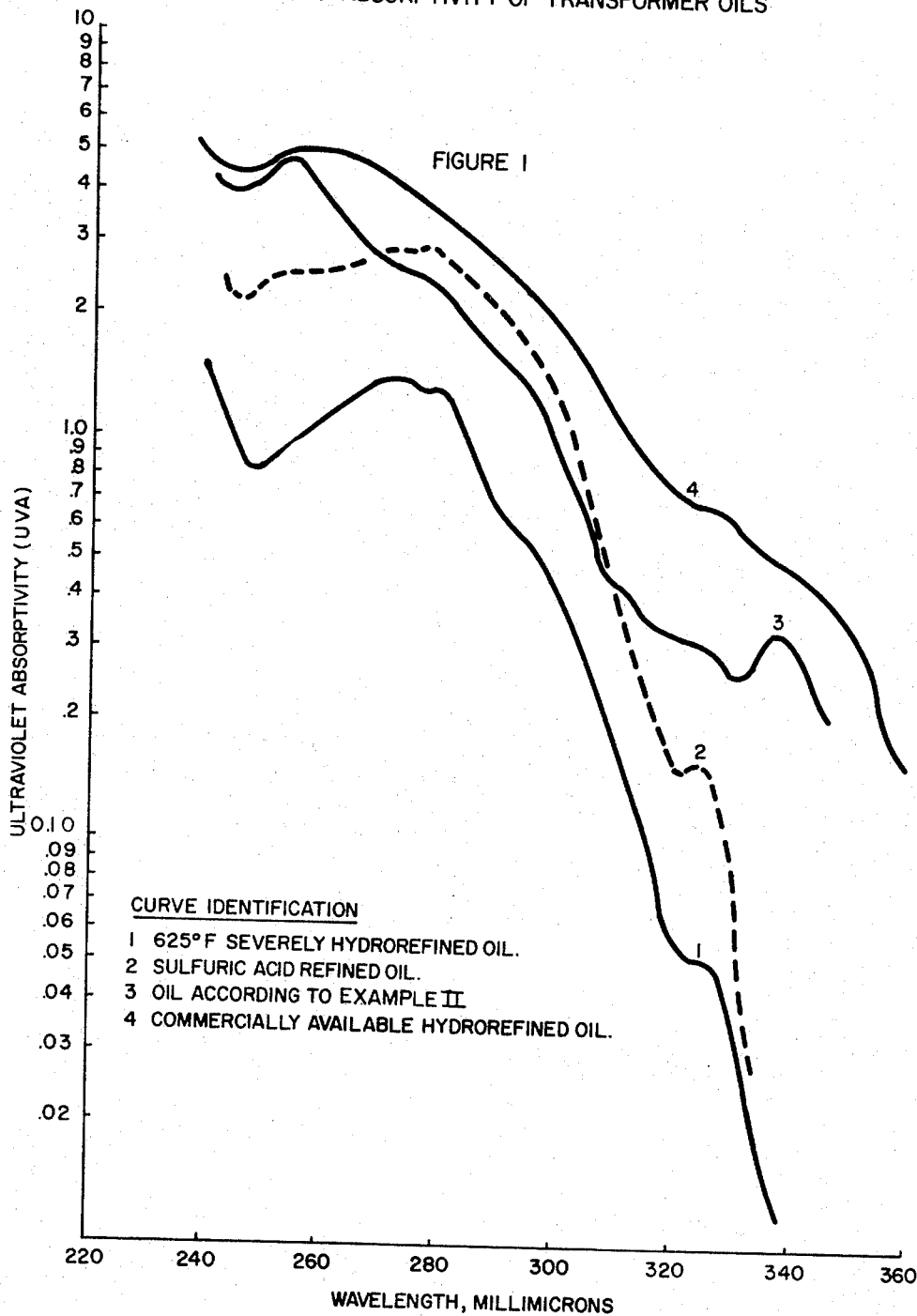
FIG. 1 illustrates the ultraviolet absorptivity curves which are obtained from transformer oils prepared by various prior art processes and compares them with a novel transformer oil having a long Doble life.

In blends of severely hydrorefined and unhydrorefined naphthenic distillates (where the unhydrorefined component is less than about 13 weight percent of the blend) the UVA curve of the blend will be similar to the UVA curve of the severely hydrorefined component and be generally more comparable in shape to curves 1 and 2 of FIG. 1 (typically being intermediate in configuration and magnitude).

When such blends contain (as a third component) a cycle oil, the curve of the resulting blend can be similar in configuration to curve 3 of FIG. 1 or if the cycle oil concentration is very low, can be intermediate between curve 1 and curve 3.

Figure 2:
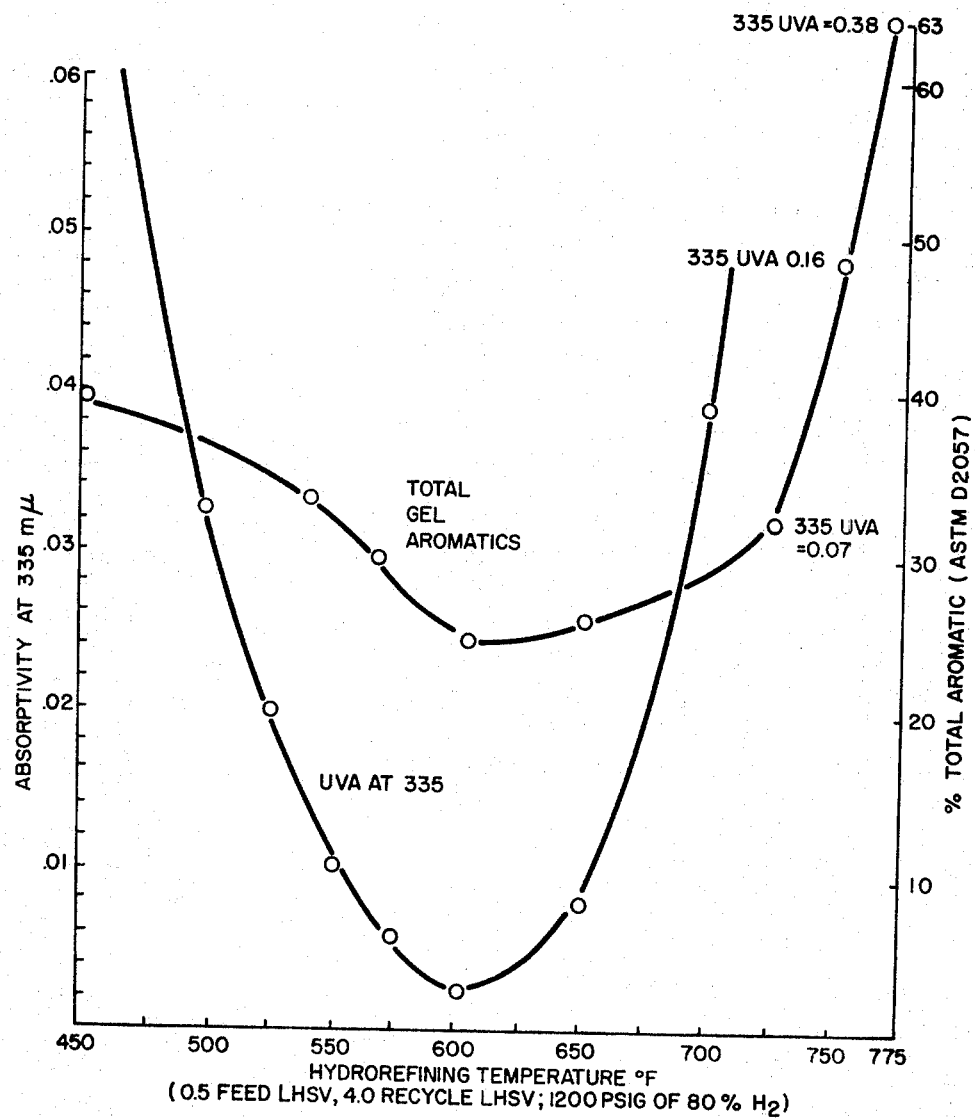

FIG. 2 illustrates the effect of the degree of severity of the hydrorefining conditions on the ultraviolet absorptivity at 335 millimicrons for a feed comprising a naphthenic acid-free, naphthenic distillate. In FIG. 2 the reaction variable which is utilized as an indication of the severity of the hydrorefining is the hydrogenation temperature (in ° F.). Note that the 335 UVA is at a minimum at about 600° F. and increases at higher temperatures, indicating that dehydrogenation and aromatization are at the higher temperatures. Similarly, the total gel aromatic content of the oil is at a minimum at 600° F. and increases at higher temperatures.

Figure 3:
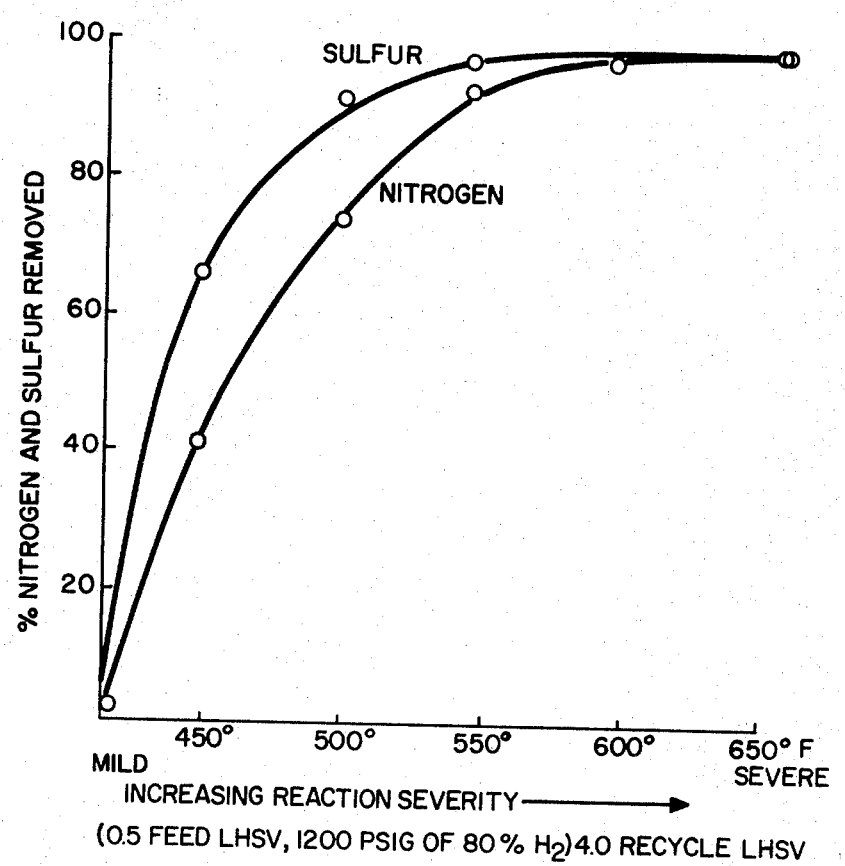

FIG. 3 shows that as the reaction severity increases (as measured by the reaction temperature) the degree of nitrogen and sulfur removal from the oil also increases until (at about 550° F. under the conditions in FIG. 3) over 90% of the nitrogen and sulfur has been removed from the oil. Note that at sufficiently severe hydrorefining conditions essentially all of the nitrogen and sulfur impurities can be removed from the oil.

Figure 4:
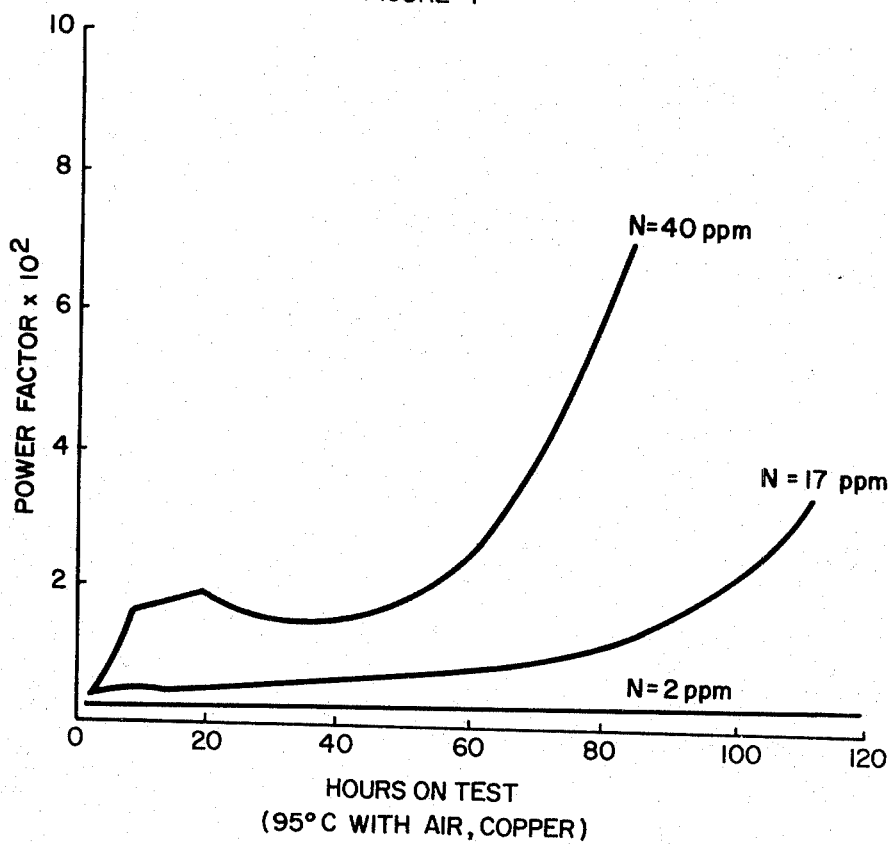

FIG. 4 shows that the nitrogen content of a naphthenic transformer oil is an indication of the performance of the oil when aged at 95° C. with air in the presence of copper. Therefore, when FIGS. 2, 3 and 4 are considered in combination, they indicate that the reaction severity in hydrorefining should be such that the degree of nitrogen removal is maximized (e.g., with sulfided Ni-Mo catalyst, such as American Cyanamid Co., HDS–3A or HDS–9A, a reaction temperature in the range of 550–650° F., preferably 585–635° F., typically about 600° F., at 0.5 LHSV of fresh feed, 4.0 recycle, 1200 p.s.i.g. of 80% H$_2$). At this range of hydrorefining severity, FIG. 2 shows that the 335 UVA will be below about 0.01 for a 55 SUS (at 100° F.) feed, thus, indicating that the oil has a very low content of tetracyclic and higher aromatic hydrocarbons which contribute to the 335 UVA. Such low nitrogen, low 335 UVA oils have a very good response to the usual oxidation inhibitors (e.g. the phenolic or amine types) used in transformer oils and, therefore, can be very useful as transformer oils where an inhibitor is permitted. However, when it is desired that the uninhibited oil have a long sludge-free life under the Doble test conditions (i.e., over 64 hours), we have discovered that the hydrorefining conditions should be sufficiently severe as to both lower the nitrogen in the oil to less than 25 p.p.m. (preferably, less than 15 p.p.m.) and also to increase the content of tetracyclic and higher aromatic compounds contributing to the 335 UVA in order that the 335 UVA is greater than 0.04, and preferably at least 0.06. Under the reaction conditions shown in FIG. 2, such an oil having a Doble life of at least 68 hours can be obtained when the reaction temperature is greater than 680° F., and preferably in the range of 685–765° F. If the fresh feed LHSV is less than 0.5, somewhat lower temperatures can be used to achieve the same degree of reaction severity as shown in FIG. 2 (e.g., an oil with a 335 UVA greater than 0.04 can be prepared at 670° F. and 0.25 LHSV). Similarly, at a higher LHSV, a higher reaction temperature is required to obtain this degree of severity. We have found that when hydrotreating with sulfided catalysts prepared from nickel molybdenum oxides or cobalt molybdenum oxides or nickel-cobalt-molybdenum oxides (on the usual carriers, such as alumina), the preferred liquid hourly space velocity of the fresh feed is no greater than 1.0 at hydrogen pressures in the range of 800 p.s.i. to 1600 p.s.i. At higher space velocities kinetic rather than equilibrium occur and the resulting oils tend to be deficient in the desirable polynuclear aromatic hydrocarbons.

Figure 5:
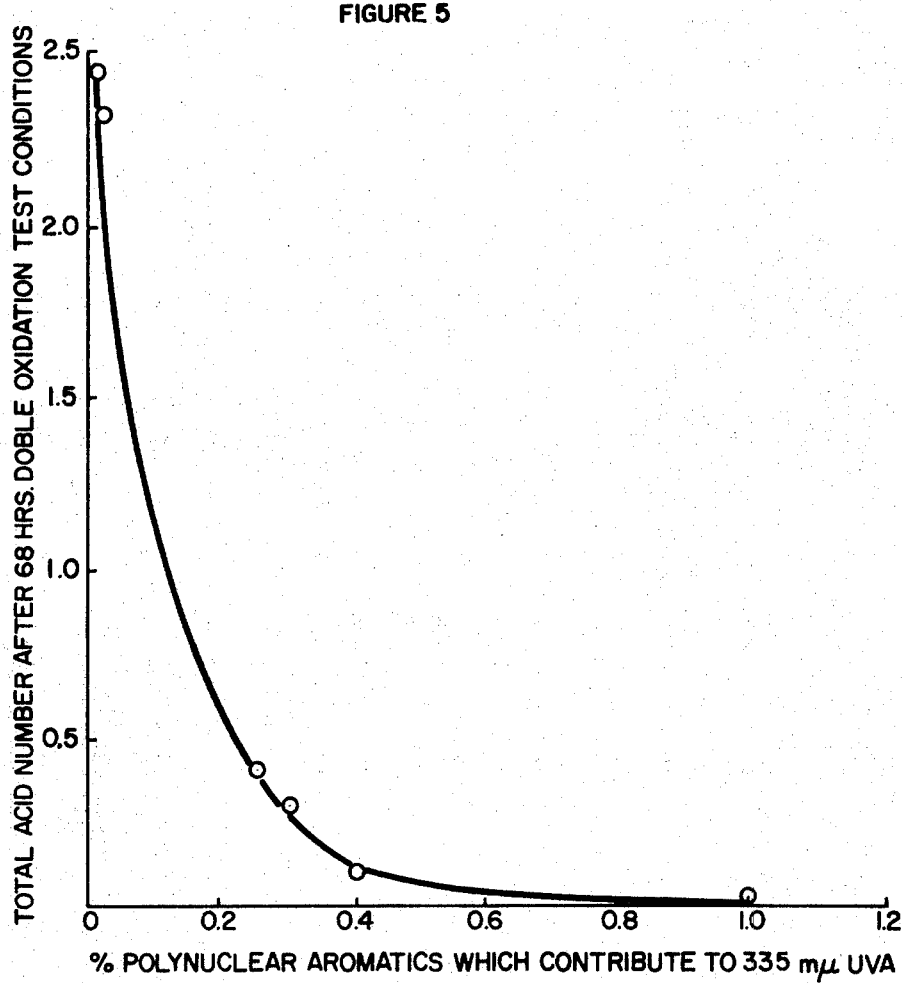

FIG. 5 shows the beneficial effect of polynuclear aromatic compounds (which contribute to 335 UVA) on oil stability under Doble oxidation test conditions (here the total acid number after 68 hours of Doble test conditions is used as an indication of oil stability). Note that for an acid number less than about 0.5, the oil must contain at least 0.2% of such polynuclear hydrocarbons containing at elast four condensed aromatic rings.

Figure 6:
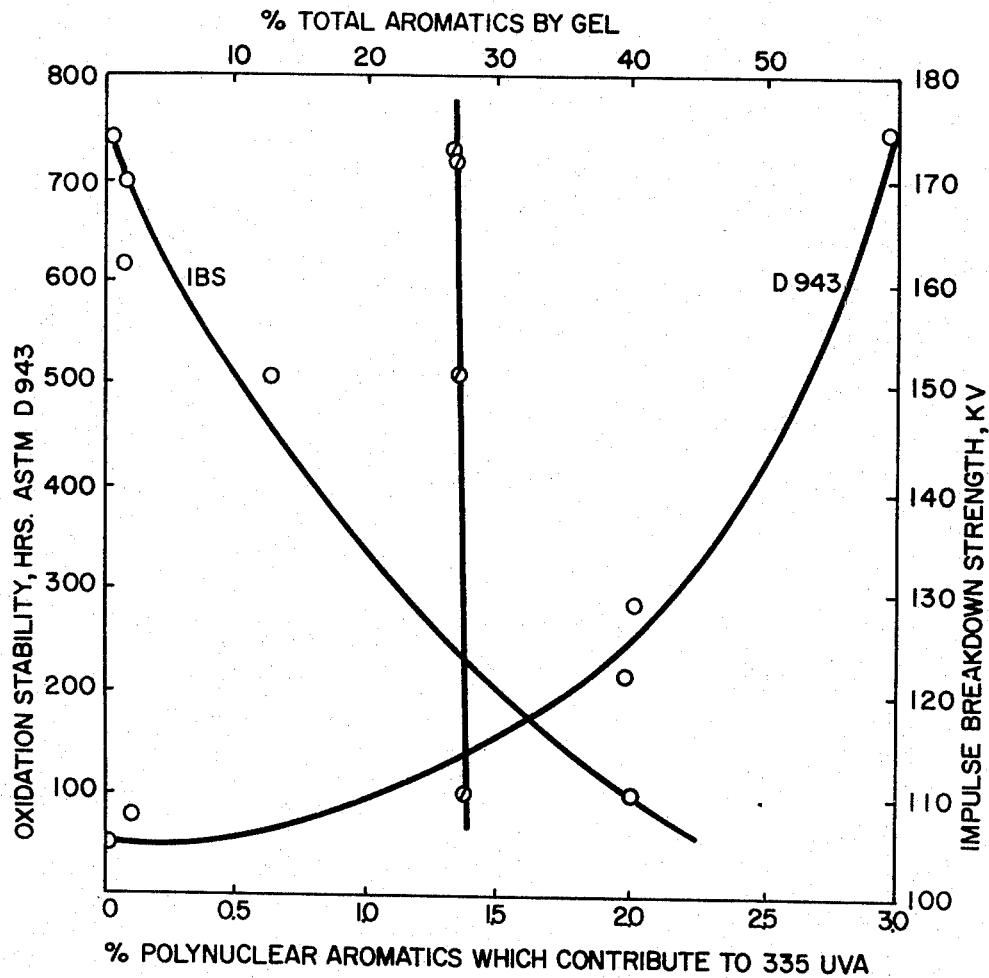

FIG. 6 contains three curves which show the effect of such polynuclear aromatic compounds on oxidation stability under ASTM D–943 test conditions and under the impulse breakdown strength test, a third curve shows the effect of total aromatic content of the oil on the impulse breakdown strength (IBS). Note that this curve is a straight vertical line indicating that aromatics per se do not adversely effect the IBS, but that IBS is highly influenced by the type of aromatic compounds in the oil. An especially good oil for a high IBS can be obtained by extraction of a severely hydrorefined naphthenic lube with an aromatic selective solvent. For example, the 80% raffinate from furfural extraction of a hydrogenated 60 SUS (at 100° F.) naphthenic distillate, has a high IBS and a good inhibitor response (however, the addition of DBPC inhibitor tends to lower the IBS). A blend of 80–95% of such a raffinate and 20–5% of unhydrogenated 40–70 SUS naphthenic distillate is also a good transformer oil. The addition of 0.1–1% cycle oil to this blend aids the Doble life.

FURTHER DESCRIPTION OF THE INVENTION

In the aforementioned patent application, Ser. No. 652,026, reference is made to our discovery that in the production of transformer oils from a 40–70 SUS (at 100° F.) naphthenic distillate by hydrorefining, it is advantageous to choose conditions (e.g., 625° F., 1200 p.s.i.g. of 80% H$_2$) such that the sulfur and nitrogen contents of the distillate are substantially reduced and there is a concomitant partial saturation of polycyclic aromatic hydrocarbons such that the ultraviolet adsorptivity of the hydrorefined product at 335 millimicrons (335 UVA) is below 0.04 (preferably below 0.01).

Such severe hydrorefining can be at a temperature in the range of 500° to 750° F. and from 800–3000 p.s.i. of hydrogen partial pressure at a liquid hourly space velocity of from 0.1–8.0, preferably conducted either in vapor phase or trickle phase. Product recycle, for example as in U.S. 2,900,433, can be used, preferably as a product to fresh feed ratio below 10:1 (more preferably 8:1 to 1:1). Preferably the temperature is below that at which substantial cracking occurs; that is, no more than 20% (preferably less than 10%) of the feed stock is converted to material boiling below 300° F.

Although the maximum hydrorefining temperature which will not produce substantial cracking is somewhat dependent upon the space velocity, the type of catalyst and the pressure, generally it is below 750° F. For servere hypdrorefining under non-aromatization conditions, we prefer to operate below 700° F., more preferably below 675° F. At total pressures below 2000 p.s.i.g. and with a fairly fresh catalyst, we prefer a temperature no greater than 650° F. since above that temperature aromatization can occur and/or the production of low boiling material and the degredation of oil viscosity can become substantial. After some months of use, if the activity of the catalyst decreases appreciably, a lower space rate and/or higher temperature (ca. 675° F.) can be used to prolong catalyst life, i.e., to delay regeneration or replacement of the catalyst. FIG. 2 is representative of results which can be obtained during the majority of the catalyst life with HDS–3A catalyst.

Typical of such severe hydrorefining methods, which can be used in our process when conducted within the processing conditions referred to herein, are those of U.S. 2,968,614; 2,993,855; 3,012,963; 3,114,701; 3,144,404 and 3,278,420. It is usual to strip $H_2S$ from the product and "top" it (by removing low boiling products) to a desired flash point and/or viscosity.

Typical catalyst are molybdenum oxide, cobalt-molybdenum oxides, nickel-molybdenum oxides, cobalt-nickel molybdenum oxides and tungsten-nickel molybdenum oxides, preferably presulfided and on a carrier such as silica, alumina, alumina-titania and alumino-silicates (either crystalline or amorphous). Nickel sulfide, nickel-molybdenum sulfide, tungsten disulfide, nickel-tungsten sulfide and molybdenum disulfide, per se or on a carrier, can also be used as catalysts. Examples of operable catalysts are those of U.S. 2,744,052; 2,758,957; 3,053,760; 3,182,016; 3,205,165; 3,227,646; and 3,264,211. A preferred catalyst will permit production of a 100 SUS at 100° F. oil having a 260 UVA of 2.5 or less at about 1000 p.s.i. $H_2$, 600° F. and 0.5 LHSV.

We prefer that such severe hydrorefining (when under conditions favoring hydrogenation) be a trickle-phase process (although gas-phase operation with hydrogen recycle up to 12,000 s.c.f./b. can be utilized) at 525–675° F. and 800 to 1600 p.s.i. of hydrogen partial pressure using a catalyst comprising nickel and molybdenum sulfides on alumina or silica. Usually a cobalt-molybdenum catalyst will require 25 to 100 percent greater hydrogen pressure, at a given temperature, recycle and LHSV, to produce a severely hydrorefined transformer oil comparable to that obtained with a sulfided nickel-molybdenum catalyst.

As has been noted in U.S. 2,973,315, the severity of hydrogenation can be measured by the hydrogen consumption. With a 40 to 200 SUS (more usually 45 to 70 SUS) naphthenic distillate feed, reaction severity can also be followed by observing the change in ultraviolet absorptivity, as in the 260 millimicron region (hereinafter sometimes the 260 UVA). For transformer oil manufacture according to the present invention, the change in absorptivity in the 335 millimicron region (335 UVA) should be observed. That is, due to hydrogenation of polycyclic aromatic hydrocarbons, the resulting hydrogenated oil will have lower (e.g. at least 40%) ultraviolet absorptivity in the 335 millimicron region (and in the 260 mM. region) than will the base oil before hydrogenation. FIG. 2 illustrates the effect of hydrorefining severity on 335 UVA.

Typically, after severe hydrogenation (under non-aromatizing conditions), the 260 mM. absorptivity of the naphtenic distillate is reduced by from 40 to 90% and is less than 5.0 for a 40 to 100 SUS naphthenic distillate feed (more commonly less than 3.5). Preferably, in the 40 to 70 SUS range, the hydrogenated oil will contain less than 0.1% sulfur and less than 25 p.p.m. of nitrogen.

Due to differences in aromatic, sulfur and nitrogen content of the base oils, hydrogen consumption can vary greatly; however, hydrogen consumption for severe hydrorefining of a naphthenic acid-free distillate is usually at least 150 s.c.f./bbl. For an indication of the large hydrogen consumption in severe hydrorefining (under non-aromatizing conditions) see U.S. Pat. 2,973,315 and the aforementioned U.S. patent application, Ser. No. 622,398. One cause of high hydrogen consumption is that we prefer to hydrorefine at conditions (e.g., 575–650° F., 900 to 1500 p.s.i. of $H_2$, total pressure 800 to 3000 p.s.i.g., no gas recycle, sulfided Ni-Mo catalyst) such that the total gel aromatics in the feed to the hydrorefining step are reduced by about 5 to 25% (mainly due to removal of polar compounds) and most (55 to 90%) of the dicyclic and higher aromatics in the feed are converted to monocyclic aromatics. In particular, under such conditions, the 335 UVA of the resulting severely hydrorefined naphthenic distillate will be less than 0.04.

In contrast, mild hydrogenation processes frequently consume less than 150 s.c.f. of $H_2$/bbl. and are characterized by little change in polycyclic aromatic content of the oil (in particular, the 335 UVA after hydrotreating is greater than 0.04 for 40 to 70 SUS naphthenic feed). Mild hydrogenation is frequently termed "hydrotreating" and is usually conducted below 800 p.s.i. of hydrogen or below 500° F. Typical of mold hydrogenation treatments are U.S. Pats. 2,865,849; 2,921,025; 2,944,015; and 3,011,972.

Although impulse breakdown strength testing is routinely applied to finished transformers (ASA Standard C.57.12.00–1965), there is a growing tendency to apply this type of testing directly to the transformer oil. A segment of the electrical industry believes that the oil impulse breakdown strength can influence the impulse breakdown strength of the oil impregnated coil and core structure of the finished transformer.

The test as applied to the oil, uses needle-sphere electrodes with a one inch gap. A 1½ x 40 negative wave is applied to the electrodes (as specified in paragraph 8.2.1 of the above-mentioned ASA standard). The breakdown voltages of the oils reported herein are the average of five separate determinations.

Oxidation stability of a transformer oil is improved by reducing nitrogen and sulfur content and by retaining (or returning) polynuclear aromatic compounds which contribute to the 335 UVA and which act as natural inhibitors. Where, however, it is desired to have an impulse breakdown strength in a transformer oil of greater than about 120 kv., such polynuclear aromatics which contribute to the 335 UVA are not desirable. If the hydrotreatment conditions are adjusted such that the resulting hydrorefined oil has a 335 UVA less than about 0.04 the impulse breakdown strength of the resulting severely hydrorefined naphthenic distillate can be as high as 175 kv., as is shown by the curve labelled IBS on the accompanying FIG. 6, which relates impulse breakdown strength to the polynuclear aromatic content of the hydrorefined oil. The percent polynuclear aromatics was determined by measuring the 335 UVA of the oil and comparing it with a calibration curve derived by measurement of the 335 UVA of samples containing known amounts of tetracyclic polynuclear aromatic compounds. In FIG. 6 (and also FIG. 5), a tetracyclic and higher polynuclear aromatic content of 1.0% corresponds to a 335 UVA of 0.15. The calibration curve is linear. At a UVA of 0.45, the polynuclear content is 3% and at a polynuclear content of 0.3% the 335 UVA is 0.045.

Also shown in FIG. 6, is a curve relating the oxidation stability as measured by ASTM Method D-943 to the percent of polynuclear aromatics contributing to the 335 UVA. This curve is labelled D–943 and, when taken in conjunction with the IBS curve on the same figure, shows that in an uninhibited transformer oil prepared from naphthenic distillate it is not possible to maximize both oxidation stability and impulse breakdown strength. However, within the limitations imposed by the laws of physics and chemistry, the curves in the figure can be used by the refiner to enable him to tailor-make an oil having a particular combination of impulse breakdown strength and oxidation stability. That is, the refiner can adjust his refining process (either by choosing aromatizing or nonaromatizing hydrorefining conditions or by blending, as by the addition of polynuclear aromatics to a severely hydrorefined oil) so that the tetracyclic and higher polynuclear aromatic content of the oil (as measured by the 335 UVA) will be such that the desired properties are obtained.

For purposes of the present invention, hydrocracked lubes can be substituted in whole or in part, for hydrogenated (or severely hydrorefined lubes) of the same 100° F. viscosity and VGC if the 335 UVA is as specified herein.

Through the use of conventional oxidation inhibitors, such as 2,6-ditertiary-butyl-p-cresol (DBPC), and the process of the present invention, severely refined transformer oils can be produced which have a maximum impulse breakdown strength and excellent oxidation stability.

In FIG. 6, the nearly vertical straight line represents the impulse breakdown strength as a function of total aromatic content of the oil and demonstrates that total aromatic content does not control impulse breakdown.

We have discovered that transformer oils having excellent color and oxidation resistance can be prepared from severely hydrorefined oils either by the addition thereto of polynuclear aromatic compounds contributing to the 335 UVA or by adjusting the hydrorefining conditions (in a second step or directly from the distillate in one step) such that sufficient hydroaromatization occurs as to convert a portion of the more highly saturated condensed polycyclic hydrocarbons in the oil to more highly aromatic hydrocarbons which contribute to the 335 UVA and which are effective as oxidation inhibitors. We have further discovered that the preferred hydrorefining conditions for severe hydrorefining (whether with or without aromatization) should include a liquid hourly space velocity LHSV) for the fresh feed of no more than 1.0 and preferably no greater than 0.5. This is to be contrasted with the process of U.S. Pat. 3,252,887, which utilizes an LHSV in the range of 1 to 3, more typically about 2.0.

In general in the present invention, the hydroaromatization of the severely hydrorefined naphthenic distillate will require a temperature above 675° F., a hydrogen pressure below 1600 p.s.i. (and preferably a total pressure below 2000 p.s.i.) and a fresh feed LHSV less than 2.0 (preferably less than 1.0). In addition to the catalysts we have listed as preferred for the severe hydrorefining of naphthenic distillate, in a two stage process involving the hydroaromatization of severely hydrorefined naphthenic distillate, a noble metal catalyst (e.g., Pt or Ru or Pd on $Al_2O_3$) or other dehydrogenation metal catalysts (e.g., Ni on $SiO_2$) can be used when the sulfur content of the hydrorefined oil is sufficiently low as to not cause catalyst poisoning.

Our preferred conditions for severe hydrorefining wherein aromatization occurs involve a temperature above 625° F. but below the temperature where substantial hydrocracking will occur, a hydrogen partial pressure in the range of 800 to 1600 p.s.i., a total pressure in the range of 1000 to 2000 p.s.i.g. and an LHSV of fresh feed in the range of 0.1 to 1.0, in the presence of a dehydrogenation catalyst, such as a catalyst containing nickel and molybdenum or compounds of these metals. Also oper- able, but not preferred, are an LHSV below 2.0 and a total pressure as low as 500 p.s.i.g.

The aforementioned U.S. Pat. 3,252,887, involved blending a high temperature hydrorefined distillate (hydrorefined at a temperature in the range of 630–670° F.) with a low temperature hydrorefined distillate (hydrorefined at a temperature in the range of 555–595° F.), wherein the hydrorefined oils are individually prepared by contacting a naphthenic distillate with a hydrorefining catalyst at an LHSV of 1 to 3 and a pressure of 500 to 900 p.s.i.g. We have discovered that highly desirable transformer oils can be prepared by blending from 15 to 85 volume percent of a severely hydrorefined naphthenic distillate having a 335 UVA less than 0.04 (e.g., under the conditions of FIG. 2, the oil hydrorefined at 600° F., and more generally, an oil hydrorefined in the range of 575–675° F.) with from 85% to 15% of a severely hydrorefined oil having a high 335 UVA (e.g., 0.6 to 1.2) wherein the hydrorefining was conducted under conditions favoring aromatization (preferably, at a temperature in the range of 725–800° F., more preferably a temperature in the range of 760–780° F.) and wherein said hydrorefined oils have been individually prepared by contacting a naphthenic distillate (preferably, naphthenic acid free) with a hydrorefining catalyst at an LHSV of the fresh feed of 0.1 to 1.0, a total pressure of 1000 to 2000 p.s.i.g. and a hydrogen pressure in the range of 800 to 1600 p.s.i. The final blended oil, or the individual components thereof, should be contacted with an adsorbent clay, such as attapulgite. Unhydrorefined naphthenic oil can be added to such a blend and/or cycle oil.

As we have noted in our previously cited copending application, Ser. No. 622,398, it is sometimes advantageous in compounding hydrorefined electrical oils to blend the base oil with from 0.05 to 20 volume percent of such additives as chelating agents, viscosity modifiers, synthetic paraffinic oils, hydrotreated oils, acid-treated naphthenic oils and naphthenic distillate (particularly naphthenic distillate which is substantially free of naphthenic acids).

Hydrorefining as practiced in our invention can produce oils having product quality which is comparable to and in many cases exceeds that of prior art oils prepared by solvent extraction and/or acid treating. Hydrorefining when compared with acid treating and solvent extraction also possesses the advantages of allowing increased yields and eliminating low quality or troublesome byproducts. In the case of transformer and other electrical oils, the heavy $H_2SO_4$ treating (which produces sulfonates) can be eliminated or be replaced with mild, non-sulfonating acid washing (to remove basic nitrogen compounds, where needed).

Another advantage of our invention is process flexibility in that our process can make a wide variety of products with differing properties from the same naphthenic distillate feed stock. This flexibility is apparent in the curves of FIG. 6, which teach the art how to obtain transformer oils having different values of impulse breakdown strength and oxidation stability.

ILLUSTRATIVE EXAMPLES

In the following examples, Example I illustrates the severe hydrorefining of a naphthenic acid free, naphthenic distillate to produce a severely hydrorefined transformer oil having a 335 UVA less than 0.04. This hydrogenated naphthenic distillate can be used as a component of the blends of the present invention.

Example II shows the preparation of a novel, transformer oil (having a long, sludge-free Doble life) by adding to the severely hydrorefined oil of Example I a minor proportion of a distillate fraction of the recycle stock from catalytic cracking of gas oil. Unhydrogenated naphthenic distillate can be added to the product of this example to improve the D–943 or D–1313 performance.

Example III shows the preparation of a transformer oil having a Doble life greater than 64 hours by hydrorefining a naphthenic distillate in a single stage under conditions such that the 335 UVA of the resulting hydrorefined oil is greater than 0.04 and the nitrogen no greater than 25 p.p.m. Unhydrogenated naphthenic distillate can be added to the product of this example to improve D–943 or D–1313 performance.

Example IV shows the catalytic aromatization of the severely hydrorefined oil of Example I under conditions such that a portion of a more saturated polynuclear hydrocarbon present in the oil is converted to polynuclear hydrocarbon which contributes to the absorptivity at 335 millimicrons, thereby producing a transformer oil having an increased sludge-free Doble life compared with that of Example I. Unhydrogenated naphthenic distillate can be added to the product of this example to improve D–943 or D–1313 performance.

Example V shows that hydrorefining conditions can be adjusted such that a transformer oil can be produced by hydrorefining which has a high impulse breakdown strength and a good performance in ASTM Oxidation Test D–1313 but that the sludge-free Doble life of such an oil is not as high as has heretofore been considered desirable in a transformer oil.

Example VI demonstrates that the inhibitor response of transformer oils can differ greatly and that inhibitor response is not necessarily a function of the stability of the uninhibited oil and that unhydrogenated (or "raw") distillate can be added to improve the D–1313 and/or D–943 performance of various hydrorefined oil or blends of hydrorefined oil and cycle oil (see FIGS. 7, 8 and 9).

Example I

A naphthenic acid free, naphthenic distillate having a 5% point of 564° F. and a 95% point of 660° F. was contacted with a catalyst prepared by sulfiding a composite of nickel and molybdenum oxides on alumina. The hydrorefining conditions were those shown in FIG. 2 hereof and included 0.5 feed LHSV, 4.0 recycle LHSV, 1200 p.s.i.g. of 80% $H_2$ and a hydrorefining temperature of 625° F. After contacting with 10 lbs./barrel of attapulgite, the resulting severely refined transformer oil had a sludge-free Doble life of less than 48 hours. The properties of the feed and product of Example I are shown in Table I hereof.

Example II

A recycle oil (from catalytic cracking of 450–750° F. gas oil with a catalyst containing 10% of a rare earth exchanged Type Y zeolite in an amorphous alumino-silicate matrix) was distilled to obtain a fraction boiling in the range of 650–750° F. Table II hereof reports the ultraviolet absorptivities at 260, 325 and 335 millimicrons of distillate fractions of the recycle oil.

Two volumes of the 650–750° F. distillate fraction of the recycle oil were blended with 98 volumes of the severely hydrorefined, adsorbent contacted product of Example I. The resulting blending oil had a 335 UVA of 0.35, and the ratio 335 UVA to 330 UVA was greater than 1.0. This blended oil product had an impulse breakdown strength of 110 and a sludge-free Doble life of greater than 150 hours. The ultraviolet absorptivity curve of the resulting blended oil is shown in FIG. 1 as curve 3 and other properties of this oil are reported in Table I as Example II product.

Example III

Example I was repeated except that the hydrorefining temperature was 750° F. and the feed LHSV 1.0 with no liquid recycle. The resulting oil had a 335 UVA of 0.16, contained 47.4% aromatics, and had a Doble life of 100 hours.

Example IV

The product of Example I was contacted in a second hydrorefining stage with the Example I catalyst under conditions favoring aromatization (730° F., LHSV 0.5, no recycle, 1200 p.s.i. of 80% hydrogen). The resulting oil had a UVA of 0.2 and a Doble life of greater than 100 hours.

Example V

Example II was repeated except that the hydrorefining temperature was 552° F., the feed LHSV 1.0, and the pressure, 1200 p.s.i.g. of 100% hydrogen. The resulting oil had an impulse breakdown strength of 162, and a sludge-free Doble life of 48 hours. Properties of the transformer oil produced in this example are listed in Table I as Example IV product.

Example VI

Although oxidation stability is normally specified by the electrical industry for uninhibited oils, transformer oils usually contain an inhibitor, such as DBPC, when incorporated in a transformer. The inhibitor response of a number of oils was studied by determining the weight percent of DBPC required to allow the resulting inhibited oil to perform satisfactorily at ASTM D–943 test conditions for 500, 1000 and 1500 hours. Table III reports the result of these studies of inhibitor response and shows that inhibitor response is related to the concentration in the oil of polynuclear aromatic compounds which contribute to the 325 UVA.

The data in Table III demonstrate that all oils do not have a comparable inhibitor response and that inhibitor response is not necessarily a function of the stability of the uninhibited oil. Note that the oils containing the lower percent of polynuclear aromatic hydrocarbons tend to show a higher response to the additive. Oil No. 1 requires approximately 0.2% DBPC to attain 1000 hours life; whereas, Oil No. 4 containing no polynuclear aromatics requires only 0.1% DBPC to provide the same protection. This example shows that the oxidation stability of an oil in the absence of an inhibitor does not necessarily indicate the stability of the oil when inhibited with a given percent of an inhibitor.

98–60 parts by weight of oils such as those of Examples I, III, IV and V can be admixed with from 2–30 parts by weight of raw naphthenic distillate (preferably, free from naphthenic acids) to obtain an oil admixture having improved performance in such tests as ASTM D–1313 and D–943.

In the drawings, FIGS. 7, 8 and 9 illustrate certain advantageous properties of such blends or admixtures. A particularly useful admixture for use as a transformer oil comprises 80 parts by weight of hydrorefined 60 SUS (at 100° F.) naphthenic distillate and 20% raw (unhydrogenated) naphthenic distillate. The resulting blend can also advantageously be finished by adsorbent contacting (e.g. with 10 lb./bbl. of attapulgite) to produce an oil which contains 26% gel aromatics, passes 180 hours of ASTM D–943 and passes for 70 hours of the Doble Test. Further improvement is observed when 0.03–0.3% of DBPC is added to the clay-finished admixture.

As an alternative to finishing the blend, the unhydrogenated distillate component can be contacted with an adsorbent (e.g. 20 lb. attapulgite per bbl. of oil). The resulting blend contains no more than 1 p.p.m. of basic nitrogen and has a 260 UVA of 1.640, 325 UVA of 0.095 and 335 UVA of 0.026.

Blends of severely hydrorefined petroleum distillate and cycle oil can be useful as reactor coolants and heat exchange fluids. In such fluids the cycle oil component can be, for example, from 10–70 weight percent of the blend and the fluid can also contain unhydrogenated distillate and/or the prior art additives, such as the aromatic ketones of U.S. Pat. 3,009,881. Such blended fluids can be used in the same manner as the fluids of U.S. Pats. 2,883,331; 2,909,487; 2,909,488; 2,933,450; 3,009,881; and 3,331,778.

As an additional component (to hyrorefined oils and unhydrogenated oils) in textile oils or refrigerator oils, high viscosity index hydrocracked oils and/or hydrogenated polyolefin oils (e.g. polybutene) can be used. In the case of the refrigerator oils such blends, of high VI hydrocracked oils, hydrorefined naphthenic oils and unhydrorefined naphthenic oil are the invention of Ivor W. Mills and John J. Melchiore (their concept also being that high VI hydrocracked oil can be substituted in whole or in part for the dewaxed paraffinic component of the blends disclosed in Ser. No. 63,303). Such hydrocracked oils are preferably solvent extracted after hydrocracking and the raffinate product used as the blending component. Examples of such hydrocracked oils are found in U.S. Pat. 3,579,435 and the following commonly-owned applications (the disclosure of which is incorporated herein by reference):

| Serial number | Filing date | Inventors |
| --- | --- | --- |
| 780,241 | 11-19-68 | Thompson et al. |
| 875,502 | 11-10-69 | Thompson. |
| 64,656 | 8-17-70 | Kress. |
| 90,073 | 11-16-70 | Thompson et al. |

The attached Table IV illustrates a number of blended transformer oils which utilize a solvent extraction step.

TABLE III
Inhibitor response of hydrorefined transformer oils

| Oil number | Percent polynuclear aromatics which contribute to 335 UVA | D943 life no DBPC | Percent DBPC required after— | | |
| --- | --- | --- | --- | --- | --- |
| | | | 500 hours | 1,000 hours | 1,500 hours |
| 1 | 2.0 | 240 | 0.050 | 0.160 | 0.35 |
| 2 | 0.1 | 120 | 0.035 | 0.125 | 0.25 |
| 3 | 0.1 | 80 | 0.10 | 0.160 | 0.20 |
| 4 | 0.0 | 36 | | 0.100 | |

NOTE.—Oil No. 1=prepared similarly to Example II product but with 2½% of the recycle from a different catalytic cracker. Oil No. 2=prepared similarly to Example I produc but at hydrorefining temperature of 650° F. in order to generate 0.1% polynuclear aromatic compounds. Oil No. 3=prepared similarly to oil of Example V. Oil No. 4=prepared similarly to Example I product but at 600° F.

TABLE IV
Solvent extraction in transformer oil manufacture

| Oil No. | Base oil | Treatment | Inhibitor | Oxidation tests | | |
| --- | --- | --- | --- | --- | --- | --- |
| | | | | Doble, hours | D943, hours | D1313, hours |
| 1 | 90% 60N; 10% 60G | 85% Raf. (furfural); 10 lbs./bbl. clay (SF or atta.) | 0 | −48, (−56), +64 | 118 | 0.064 |
| 2 | 90% 60N; 10% 60G | 85% Raff. (furfural) | 0.02% DBPC | −64, (−72) | | |
| 3 | 90% 60N; 10% 60G | 85% Raff. (furfural) | 0.5% cycle oil | ¹−72 | | |
| 4 | 90% 60N; 10% HT Raff | 0 or 10 lbs./bbl. SF or atta | 0 | +48 | | |
| 5 | 90% 60N; 10% HT Raff | None | 0.02% DBPC | −64, (−72) | | |
| 6 | 90% 60N; 10% HT Raff | 0 or 10 lbs./bbl. SF or atta | 0.5% cycle oil | | | |

¹ One experiment.

NOTE.—"60N" is hydrorefined naphthenic distillate having viscosity at 100° F. of 60 SUS. "60G" is the "raw" distillate which is hydrogenated to make the "60N." "HT Raff" is a raffinate (85% yield) from furfural extraction (160° F. separation temperature at 150 volume percent furfural dosage based on feed) of the "60G." "85% Raff. (furfural)" indicates the raffinate product of a furfural extraction of the "base oil" at the conditions noted above for "HT Raff." "DEPC" is dibutylparacresol inhibitor.

TABLE I
Properties of transformer oils

| | Example I feed | Example I product | Example II product | Example V product | Conventional transformer ¹ | Conventional transformer ² |
| --- | --- | --- | --- | --- | --- | --- |
| Viscosity, SUS/100° F | 57.2 | 57.5 | 57.4 | 57.9 | 57.3 | 57.2 |
| Gravity, API° | 25.1 | 26.5 | 26.0 | 26.5 | 25.7 | 25.9 |
| Total nitrogen, p.p.m | 74 | >20 | 24 | 23 | 10 | 5 |
| Total sulfur, wt. percent | 0.17 | 0.04 | 0.05 | 0.05 | 0.15 | 0.05 |
| Aromatics, wt. percent | 40 | 25.5 | 27.3 | 26.9 | 35 | 32 |
| Performance: | | | | | | |
| Oxidation ASTM D-943, hours, uninhibited | 80 | 13 | 204 | 68 | 90 | 90 |
| Oxidation ASTM D-1313, percent sludge (GE Bomb) | 0.14 | 76 | 0.05 | 0.06 | 0.06–0.08 | 0.06 |
| Impulse breakdown strength, (kv.) | | 170+ | 110 | 162 | | 152 |
| 335 UVA | 0.09 | 0.015 | 0.35 | 0.024 | 0.045 | 0.019 |
| 325 UVA | 0.38 | 0.05 | 0.35 | 0.083 | 0.25 | 0.17 |
| 260 UVA | 5.1 | 1.2 | 3.8 | 1.48 | 3.5 | 2.5 |
| Sludge-free Doble life (hours) | <24 | <48 | 150+ | 48 | <48 | 64 |

¹ 10 lb./bbl. of 99% H₂SO₄ of acid-free naphthenic distillate.
² 35 lb./bbl. of 99% H₂SO₄ treatment of furfural raffinate of acid-free naphthenic distillate.

TABLE II
Boiling range and absorptivities of recycle oil from catalytic cracking of 450–700° F. gas oil

| Percent distilled | Temp.,° F. at 760 mm. | Absorptivities at— | | |
| --- | --- | --- | --- | --- |
| | | 260 mµ | 325 mµ | 335 mµ |
| Initial | 372 | | | |
| 10 | 601 | 19.9 | 1.0 | 0.4 |
| 20 | 616 | | | |
| 30 | 649 | 45.2 | 2.2 | 1.9 |
| 40 | 679 | | | |
| 50 | 706 | 98.6 | 5.7 | 6.8 |
| 60 | 712 | | | |
| 70 | 744 | 118.0 | 15.5 | 16.4 |
| 80 | 794 | | | |

The invention claimed is:

1. A refined petroleum oil having a viscosity in the range of 40–1000 SUS at 100° F. and comprising a blend of
   (a) 25–95 parts by weight of a hydrorefined petroleum distillate having a viscosity-gravity constant (VGC) in the range of 0.78–0.94, a viscosity at 100° F. in the range of 40–10,000 SUS, and an ultraviolet absorptivity (UVA) at least 40% less than the 335 UVA of an unhydrorefined petroleum distillate of about the same 100° F. viscosity and VGC, and;
   (b) 75–5 parts by weight of an unhydrorefined, uncracked, non-acid treated petroleum distillate having a VGC in the range of 0.78–0.94 and a viscosity at 100° F. in the range of 40–10,000 SUS.

2. An oil according to claim 1 and which contains as an additional component from 0.1–60 parts by weight of cycle oil which is rich in hydrocarbons which produce ultraviolet absorptivity at 335 millimicrons.

3. An oil according to claim 1 wherein said hydrorefined distillate has a VGC in the range of 0.840–0.889 and said unhydrorefined distillate has a VGC in the range of 0.840–0.889.

4. An oil according to claim 2 and which contains in the range of 0.1–10 weight percent of said cycle oil.

5. A refined petroleum oil which has an impulse breakdown strength of at least 150 kv., an ASTM D–1313 test value no greater than 0.1 and which will pass at least 50 hours of the ASTM D–943 stability test, said hydrocarbon oil having a viscosity in the range of 40–1000 SUS at 100° F., a viscosity-gravity constant in the range of 0.82–0.94 and an ultraviolet absorptivity at 320 millimicrons no greater than 0.1.

6. An oil according to claim 5 and which has a viscosity gravity constant in the range of 0.82–0.899 and contains in the range of 20–30 weight percent of aromatic hydrocarbons by gel analysis and wherein the ultraviolet absorptivity at 330 millimicrons is less than 0.1 and the ratio of the ultraviolet absorptivity at 335 millimicrons to the absorptivity at 330 millimicrons is less than 1.0.

7. An oil according to claim 6 and wherein said hydrogenated oil has been obtained by hydrogenation of a naphthenic distillate, said hydrogenation being at a temperature in the range of 550–660° F., at hydrogen partial pressure at the reactor inlet in the range of 800–2000 p.s.i. and a total pressure in the range of 800–4000 p.s.i.g., a feed liquid hourly space velocity in the range of 0.1–1.0, and in the presence of a catalyst comprising sulfided NiMo oxides on a carrier selected from the class consisting of alumina, silica, and alumino-silicate.

8. An oil according to claim 7 wherein said oil comprises in the range of 70–95 weight percent of said hydrorefined oil and from 5–30% of unhydrogenated naphthenic distillate which contains in the range of 30–45 weight percent gel aromatics and is substantially free of naphthenic acids.

9. An oil according to claim 5 wherein said oil has a viscosity at 100° F. in the range of 40–200 SUS.

10. An oil according to claim 8 and wherein said oil has a viscosity in the range of 45–70 SUS at 100° F. and is useful as a transformer oil.

11. The oil of claim 1 wherein said unhydrogenated, uncracked, non-acid-treated oil is selected from
   (a) raffinate from solvent extraction of a naphthenic distillate;
   (b) naphthenic distillate;
   (c) naphthenic acid-free naphthenic distillate;
   (d) and dewaxed paraffinic distillate; and,
   (e) mixtures of two or more members from (a), (b), (c) and (d) above.

12. The oil of claim 1 wherein said hydrogenated oil is selected from
   (a) hydrorefined paraffinic petroleum oil;
   (b) hydrorefined naphthenic petroleum oil;
   (c) hydrocracked petroleum oils; and,
   (d) mixtures of two or more members from (a), (b) and (c) above.

References Cited
UNITED STATES PATENTS

| | | | |
|---|---|---|---|
| 3,000,807 | 9/1961 | Wasson et al. | 208—14 |
| 3,419,497 | 12/1968 | Rocchini et al. | 208—19 |
| 3,619,414 | 11/1971 | Mills et al. | 208—14 |
| 3,196,102 | 7/1965 | Mills et al. | 208—14 |
| 2,846,372 | 8/1958 | Schneider et al. | 208—14 |
| 3,318,799 | 5/1967 | Acker et al. | 208—14 |

HERBERT LEVINE, Primary Examiner

U.S. Cl. X.R.

208—19, 264